J. B. SARGENT.
Andiron.
No. 21,218.
Patented Aug. 17, 1858.
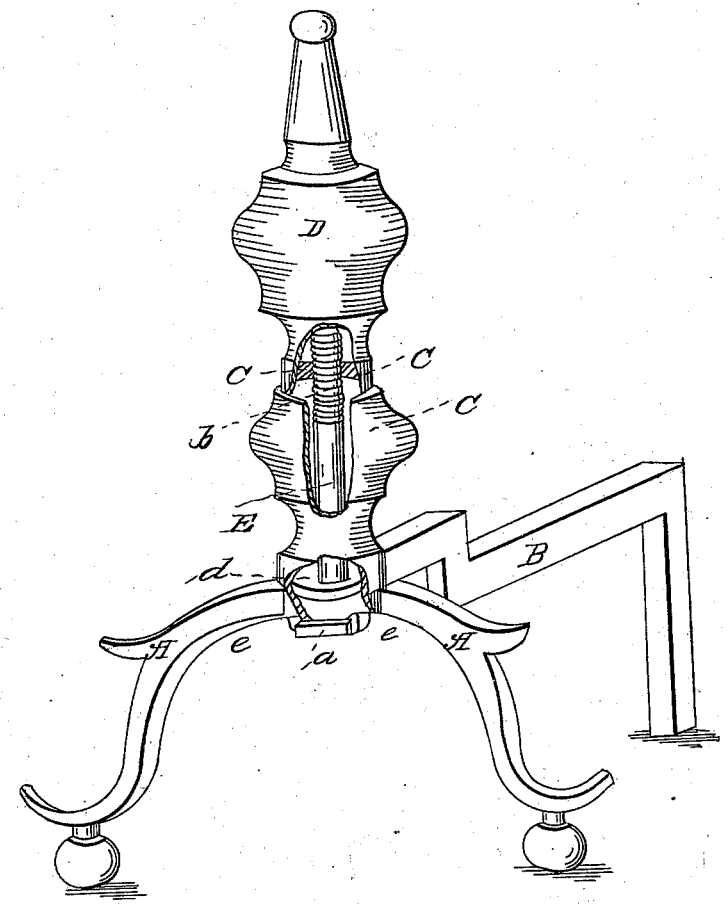

UNITED STATES PATENT OFFICE.

J. B. SARGENT, OF NEW BRITAIN, CONNECTICUT.

ANDIRON.

Specification of Letters Patent No. 21,218, dated August 17, 1858.

*To all whom it may concern:*

Be it known that I, JOSEPH B. SARGENT, of New Britain, county of Hartford, and State of Connecticut, have invented a new and useful Improvement in the Mode of Manufacturing Andirons in a Detachable Manner; and I do hereby declare that the same is described and represented in the following specification and drawings; and to enable others skilled in the art to make and use the same I will proceed to describe the construction, referring to the drawings, in which the same letters indicate like parts in each of the figures.

The nature of this improvement in andirons consists in the mode of manufacture whereby they are more cheaply made and easily detached, to be packed closely in crates or boxes, thereby preventing the great amount of breakage in the transporting.

In the accompanying drawing is represented my improvement in the mode of manufacture of andirons having a portion cut from the pillar thereof to show the mode of constructing and securing the same together.

A are the front legs, B, the fireirons which support the wood.

C, D, is a pillar or ornamental support made in two parts.

E is a bolt which connects and holds all the parts together.

The front legs A when detached are entirely separate from the other parts and have lips e provided on each side of the bolt head E, to prevent the bolt from turning. The fireiron B, is made in any desirable shape to suit the fancy, the outer end of which joins on to the legs, being flattened, and formed into the desired shape to give strength, and allow of a hole for the bolt to pass through, and also having a shoulder on the under side to fit up to the legs, and keep them in right angle with the fire-iron. The base or lower part of the pillar C, is fitted down over the fire-iron flush with the underside of the legs, and having projections upon the inside, so as to give a good and substantial bearing upon the legs and fire-irons. The upper portion of the pillar D, is fitted into the groove in the upper end of the base C, and having a nut c prepared for the purpose of securing the whole together. The bolt E is made with a square head a on one end and screw b cut on the other end fitted to the nut c in the upper portion of the pillar D.

It will readily be seen that when the fireiron and the lower portion of the pillars are properly fitted to the legs, and the bolt passed up through them, and the upper portion of the pillar containing the nut c is screwed onto the bolt, the andiron is complete; and is the work of but a moment to put it together or take it apart.

The advantage derived by this improvement over others now in use are: the facility afforded thereby for closely and safely packing for transportation; they will pack into less than half the ordinary bulk, and will entirely remove the risk of breakage which is found to be not less than five per cent.; they can be manufactured at less cost of labor and material, and the respective parts may be taken indiscriminately and put together when required.

I am aware that andirons have been made having a bolt with a screw on the upper end for the purpose of securing the ornamental pillar and also having a shoulder on the lower end passing through the legs and fire iron, and riveted on the underside, which cannot be said to be detachable; nor neither do I claim such; but

What I claim is—

The construction and arrangement of the legs A the fire iron B, the pillar C, D, all secured together by the bolt E, in the nut c in the upper portion of the pillar D, all of which can be readily detached when desired in the manner and for the purpose as described.

JOSEPH B. SARGENT. [L. S.]

Witnesses:
S. C. NORTHROP,
M. H. STANLEY.